(12) United States Patent
Nishizawa et al.

(10) Patent No.: US 11,940,031 B2
(45) Date of Patent: Mar. 26, 2024

(54) COIL SPRING

(71) Applicant: NHK SPRING CO., LTD., Yokohama (JP)

(72) Inventors: Shinichi Nishizawa, Walled Lake, MI (US); Daisuke Ibano, Yokohama (JP); Tsuyoshi Matsuda, Yokohama (JP); Norifumi Arisaka, Yokohama (JP); Shun Muramatsu, Yokohama (JP); Chihiro Ito, Yokohama (JP); Takuto Suzuki, Yokohama (JP); Masatake Kinoshita, Yokohama (JP); Asuka Kawasaki, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 17/703,295

(22) Filed: Mar. 24, 2022

(65) Prior Publication Data

US 2023/0304557 A1     Sep. 28, 2023

(51) Int. Cl.
*F16F 1/04* (2006.01)
*F16F 1/06* (2006.01)
*B60G 11/14* (2006.01)

(52) U.S. Cl.
CPC ............. *F16F 1/043* (2013.01); *F16F 1/06* (2013.01); *B60G 11/14* (2013.01);
(Continued)

(58) Field of Classification Search
CPC .......... F16F 1/043; F16F 1/06; F16F 2230/00; F16F 2230/0023; F16F 2238/026;
(Continued)

(56) References Cited

U.S. PATENT DOCUMENTS

| 231,150 A | 8/1880 | Cliff |
| 338,267 A | 3/1886 | Hearle |

(Continued)

FOREIGN PATENT DOCUMENTS

| CN | 201382112 Y | 1/2010 |
| DE | 19619074 A1 | 11/1997 |

(Continued)

OTHER PUBLICATIONS

International Search Report and Written Opinion dated Jan. 18, 2022, issued in International Application No. PCT/ JP2021/040372.

(Continued)

*Primary Examiner* — Thomas W Irvin
(74) *Attorney, Agent, or Firm* — Holtz, Holtz & Volek PC

(57) ABSTRACT

A coil spring includes a wire rod and an elastic coat provided on the wire rod. The coil spring includes a coil section including a plurality of coil portions. The wire rod includes a round cross-sectional portion, a cross-section varying portion, and a rectangular cross-sectional portion along the longitudinal direction of the wire rod. The cross section of the rectangular cross-sectional portion is substantially square and has a first plane and a second plane. The first plane and the second plane oppose each other in the coil section. The elastic coat is provided on at least one of the first plane and the second plane. The elastic coat is continuous from the round cross-sectional portion to the cross-sectional variation portion and the rectangular cross-sectional portion.

13 Claims, 16 Drawing Sheets

(52) U.S. Cl.
CPC ...... *B60G 2202/12* (2013.01); *B60G 2206/42* (2013.01); *B60G 2600/44* (2013.01); *B60G 2800/162* (2013.01); *F16F 2230/00* (2013.01); *F16F 2230/0023* (2013.01); *F16F 2238/026* (2013.01)

(58) Field of Classification Search
CPC .......................... B60G 11/14; B60G 2202/12; B60G 2206/42; B60G 2600/44; B60G 2800/162
USPC ........................... 267/180, 286, 249, 248, 33
See application file for complete search history.

(56) References Cited

U.S. PATENT DOCUMENTS

| | | | | |
|---|---|---|---|---|
| 1,963,054 | A | | 6/1934 | Powers |
| 2,230,069 | A | * | 1/1941 | Rushmore ............... F16F 1/024 174/130 |
| 2,605,099 | A | * | 7/1952 | Brown ...................... F16F 3/12 220/666 |
| 3,727,902 | A | | 4/1973 | Burckhardt et al. |
| 4,111,407 | A | | 9/1978 | Stager |
| 4,424,695 | A | | 1/1984 | Kirchhoff et al. |
| 4,753,423 | A | * | 6/1988 | Ukai ....................... F16F 1/024 267/167 |
| 4,763,882 | A | * | 8/1988 | Nishiyama ................ F16F 3/12 267/152 |
| 4,869,471 | A | * | 9/1989 | Schwarz ................. F16F 1/024 267/180 |
| 4,886,256 | A | * | 12/1989 | Nishiyama ............. B60G 15/07 267/221 |
| 5,310,167 | A | * | 5/1994 | Noll, Jr. .................. F16F 1/024 267/286 |
| 6,193,225 | B1 | | 2/2001 | Watanabe |
| 6,698,780 | B2 | * | 3/2004 | Miyoshi ................. B62K 25/30 280/283 |
| 10,065,471 | B2 | | 9/2018 | Nishizawa |
| 10,144,261 | B2 | | 12/2018 | Nishizawa |
| 10,155,425 | B2 | | 12/2018 | Nishizawa |
| 2020/0208702 | A1 | * | 7/2020 | Ono ........................ C22C 21/06 |
| 2022/0178415 | A1 | | 6/2022 | Nishizawa et al. |

FOREIGN PATENT DOCUMENTS

| | | |
|---|---|---|
| DE | 102014102061 A1 | 8/2015 |
| JP | S151179 Y1 | 2/1940 |
| JP | S51129554 A | 11/1976 |
| JP | S52131556 U | 10/1977 |
| JP | S5452257 A | 4/1979 |
| JP | S5534520 U | 3/1980 |
| JP | S56141431 A | 11/1981 |
| JP | S5711743 A | 1/1982 |
| JP | S5855372 A | 4/1983 |
| JP | S5855372 B2 | 12/1983 |
| JP | S62155342 A | 7/1987 |
| JP | 2000337415 A | 12/2000 |
| JP | 2003206968 A | 7/2003 |
| WO | 2022123960 A1 | 6/2022 |
| WO | 2022260180 A1 | 12/2022 |

OTHER PUBLICATIONS

Related U.S. Appl. No. 17/113,438; First Named Inventor: Shinichi Nishizawa; Title: "Coil Spring"; filed Dec. 7, 2020.
Related U.S. Appl. No. 17/830, 147; First Named Inventor: Shinichi Nishizawa; Title: "Coil Spring"; filed Jun. 1, 2022.
Notice of Allowance dated Mar. 2, 2022, issued in related U.S. Appl. No. 17/113,438.
Office Action (Non-Final Rejection) dated Oct. 8, 2021, issued in related U.S. Appl. No. 17/113,438.
International Search Report (ISR) and Written Opinion dated Apr. 4, 2023, issued in counterpart International Application No. PCT/JP2023/008340.
International Search Report (ISR) and Written Opinion dated Aug. 1, 2023, issued in International Application No. PCT/JP2023/020333 (which is a counterpart of related U.S. Appl. No. 17/830,147).
Related U.S. Appl. No. 18/494,235, First Named Inventor: Shinichi Nishizawa; Title: "Coil Spring and Suspension for Vehicle"; filed Oct. 25, 2023.
Related U.S. Appl. No. PCT/US2023/077735, First Named Inventor: Shinichi Nishizawa; Title: "Coil Spring and Suspension for Vehicle"; Filed: Oct. 25, 2023.
International Search Report (ISR) dated Jan. 25, 2024, issued in International Application No. PCT/US23/77735.
Written Opinion dated Jan. 25, 2024, issued in International Application No. PCT/US23/77735.

* cited by examiner

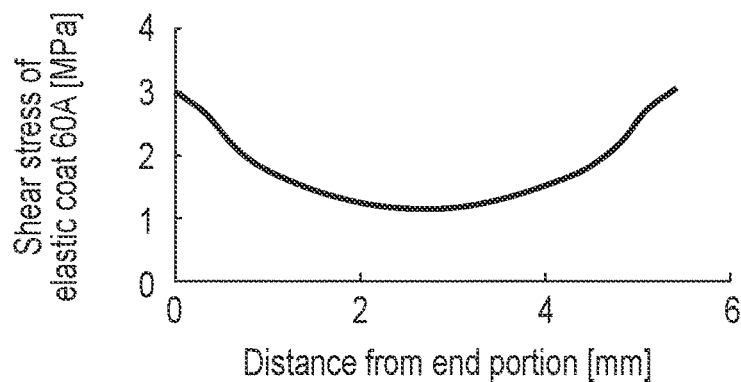
F I G. 7A
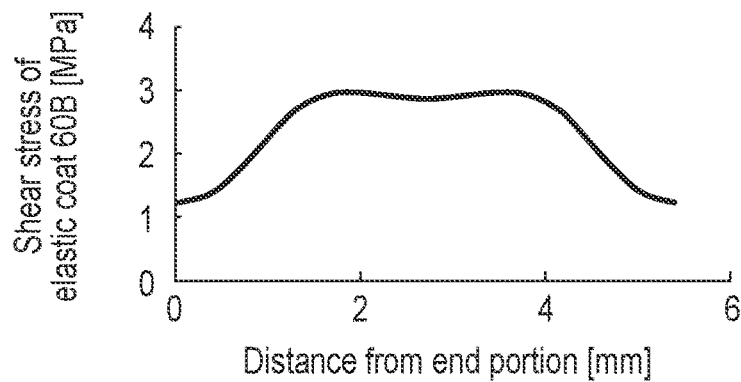
F I G. 7B
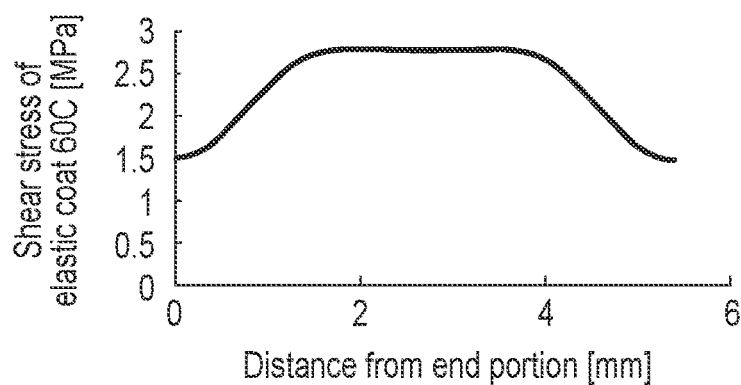
F I G. 7C

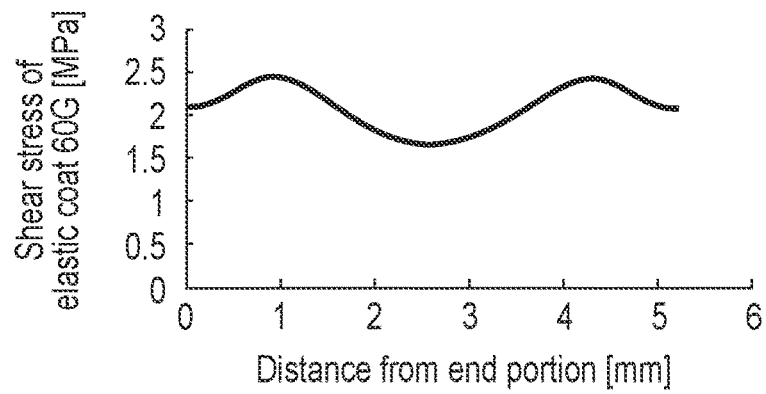
F I G. 7G
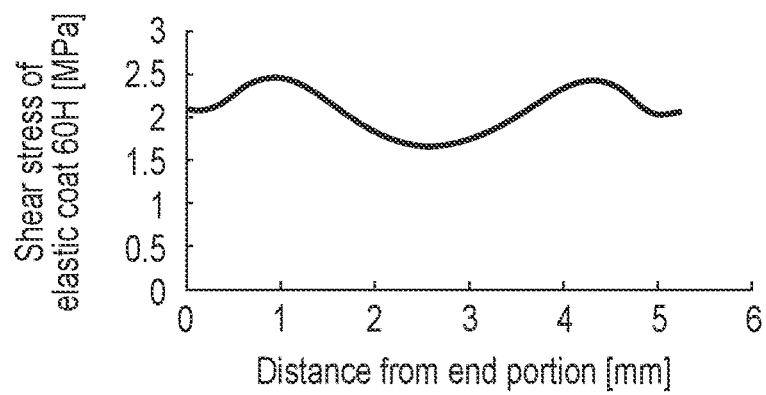
F I G. 7H
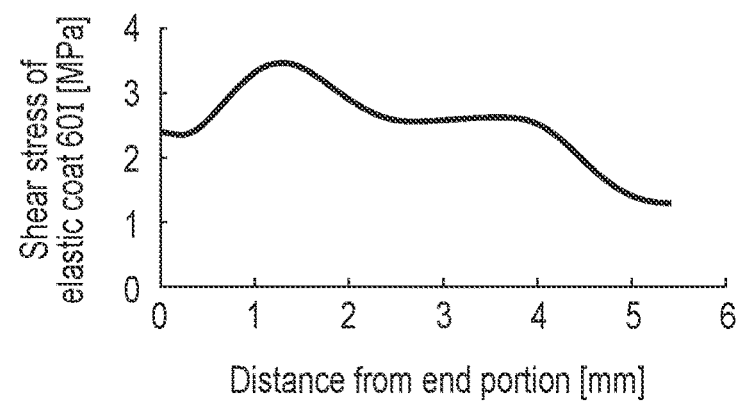
F I G. 7I

COIL SPRING

BACKGROUND OF THE INVENTION

1. Field of the Invention

The present invention relates to a coil spring having a plurality of coil portions formed into a spiral shape, and in particular to a coil spring with an elastic coat on at least a part of the coil portions.

2. Description of the Related Art

Coil springs used in vehicle suspension devices include a helically-wound wire rod. In general, the cross-section of the wire rod (the cross-section perpendicular to the longitudinal direction of the wire rod) is round. The coil spring includes a first end turn part in contact with a first spring seat of the suspension device, a second end turn part in contacts with a second spring seat and an effective spring part between the first end turn part and the second end turn part. The effective spring part includes a plurality of coil portions, and depending on the magnitude of the load, some of the coil portions may be brought into contact with each other.

JP S58-55372 B2 (Patent Literature 1) discloses a coil spring which includes a coating portion made of thermoplastic resin at sections where the coil portions of the effective spring part face each other. The coating portion is attached to the coil portions of the wire rod, which are round in cross section, to mitigate the sound (so-called striking sound) generated when the coil portions are brought into contact with each other. For this reason, the coating portion is conventionally provided only on the effective spring part of the wire rod, which has a round cross section. But, when the coating portion is applied on a wire rod with a round cross-section, stress concentrates on a part of the coating portion when the coil portions are brought into contact with each other due to the load of compression, which may affect the durability thereof.

Incidentally, for some specifications of the suspension device, a coil spring with nonlinear characteristics may be desired. An example of coil springs with nonlinear characteristics is disclosed in U.S. Pat. No. 4,111,407 A (Patent Literature 2). The coil spring of Patent Literature 2 includes a wire rod with a small cross sectional portion, in which the diameter of the wire rod decreases in a tapered manner from the middle of the effective spring part towards the tip of the wire rod. Moreover, J P 2000-337415 A (Patent Literature 3) discloses a coil spring which includes a flat-tapered small sectional portion in a part of the wire rod. In such a coil spring including a small sectional portion part in a part of the wire rod, when the small sectional portion is scratched, the scratch may lead to serious damage to the coil spring.

BRIEF SUMMARY OF THE INVENTION

An object of the present invention is to provide a coil spring that can suppress defects such as damage to wire rod, which may be caused as coil portions of the wire rod are brought into contact with each other and is suitable for particularly suspension springs for vehicles.

According to one embodiment of the present invention, there is provided a coil spring including a wire rod with one end and another end and including a coil section comprising a plurality of coil portions, which comprises a rectangular cross-sectional portion. The rectangular cross-sectional portion has a cross-section perpendicular to a longitudinal direction of the wire rod is rectangular, and includes a first plane and a second plane. The first plane and the second plane oppose each other in the coil section. On at least one of the first plane and the second plane, an elastic coat provided.

An example of the elastic coat is made of a cured material of a resin having urethane bonds. Another example of the elastic coat is made of a composition containing a prepolymer in which a polyol and an isocyanate have reacted with each other. The tear strength of the elastic coat should preferably be 20 kN/m or more but 350 kN/m or less at 25° C. and 80° C. When the coil spring of this embodiment is used as a suspension spring for a vehicle, the shear stress of the elastic coat at 25° C. should be 6.0 MPa or less when the coil spring is compressed at maximum. The shear stress referred to here is the shear stress at the interface between the wire rod and the elastic coat. The compressive stress of the elastic coat should preferably be 20 MPa or less.

The coil spring of this embodiment can suppress damage to the wire rod due and banging noise, which may be caused as coil portions come into contact with each other. Moreover, the elastic coat of this embodiment is firmly secured to the wire rod to suppress defects such as peeling off of the elastic coat from the wire rod.

According to the coil spring of the embodiment, the wire rod may have a round cross-sectional portion and a cross section varying portion formed between the round cross-sectional portion and the rectangular cross-sectional portion. The elastic coat may be provided continuously from the round cross-sectional portion over to cross section varying portion and the rectangular cross-sectional portion along the longitudinal direction of the wire rod. For example, the elastic coat includes a first coat portion provided on the round cross-sectional portion, a second coat portion provided on the cross section varying portion, and a third coat portion provided on the rectangular cross-sectional portion.

The coil spring of the embodiment may comprise a first end turn part including the one end of the wire rod, a second end turn part including the other end of the wire rod and an effective spring part between the first end turn part and the second end turn part. One of the first end turn part and the second end turn part may include the rectangular cross-sectional portion, and the elastic coat may be provided on the rectangular cross-sectional portion.

The cross section varying portion may comprise a first plane portion continuous to the first plane of the rectangular cross-sectional portion, and the elastic coat may be provided continuously over the first plane and the first plane portion. The rectangular cross-sectional portion may include arc-shaped corner portions formed on respective sides of the first plane, and a width of the elastic coat may be less than or equal to a width of the first plane.

The elastic coat of the embodiment may be provided on a part of the plurality of coil portions. Further, the elastic coat may be provided only on those coil portions of the plurality of coil portions that may come into contact with each other when the coil spring is compressed. The elastic coat may comprise a plurality of elastic coat elements disposed to be spaced apart from each other along the longitudinal direction of the wire rod.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

3

BRIEF DESCRIPTION OF THE SEVERAL
VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 7A to 7K are views each showing shear stress acting on an interface of each elastic coat when the elastic coats shown in FIGS. 5A to 5K are in a compressed state.

DETAILED DESCRIPTION OF THE
INVENTION

A coil spring according to one embodiment of the present invention will now be described with reference to FIGS. 1 to 4.

Figure 1:
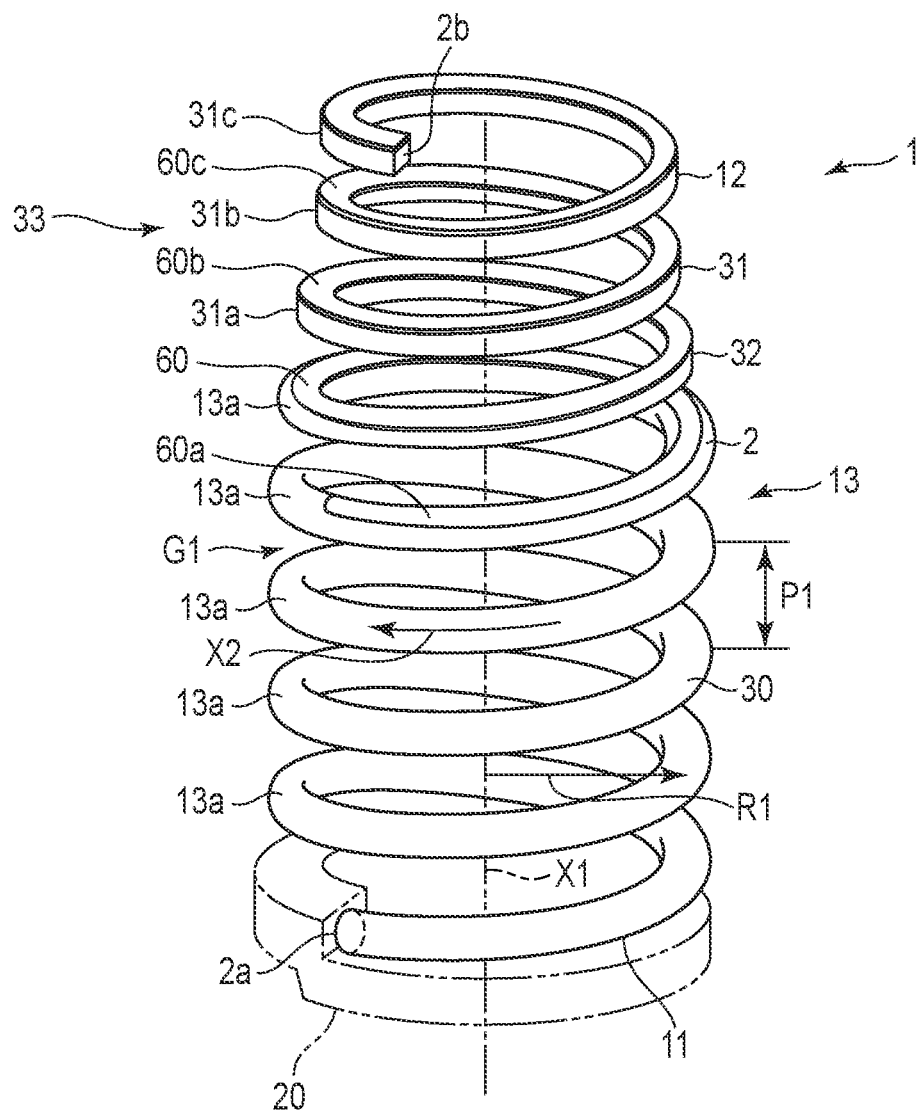
FIG. 1 is a perspective view of a coil spring according to one embodiment.
Figure 2:
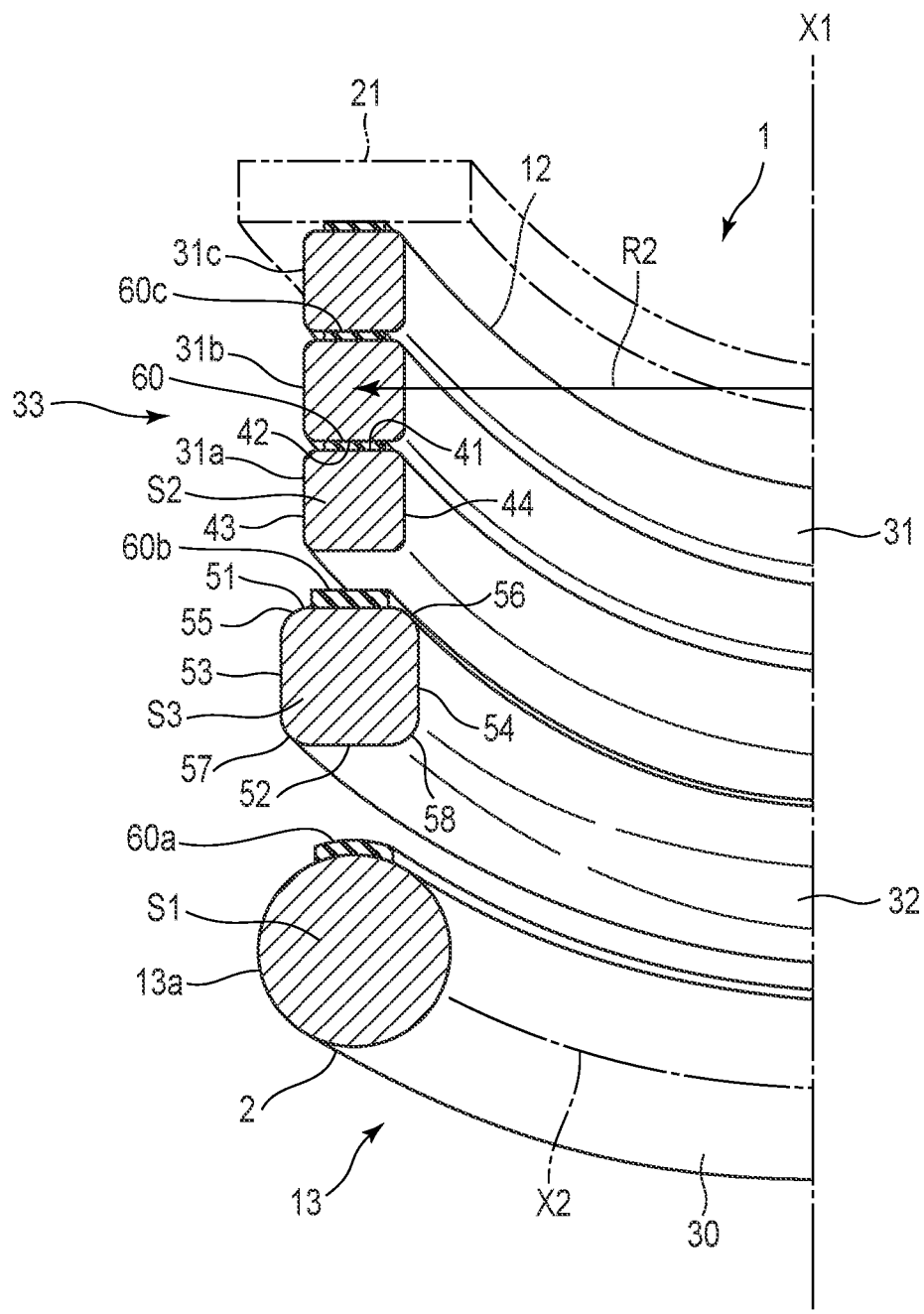
FIG. 2 is a perspective view of the coil spring shown in FIG. 1, including cross sections of a wire rod thereof, in a compressed state.

FIG. 1 shows a coil spring 1 used in a suspension device of a vehicle such as an automobile. FIG. 2 is a perspective view of the coil spring 1 in a compressed state, including cross sections of portions of the spring. The coil spring 1 comprises a wire rod 2 formed into a spiral shape. The wire rod 2 is made of, for example, spring steel. The coil spring 1 includes a first end turn part 11 including one end 2a of the wire rod 2, a second end turn part 12 including the other end 2b of the wire rod 2 and an effective spring part 13. The effective spring part 13 is formed between the first end turn part 11 and the second end turn part 12 and includes a plurality of coil portions 13a. When the coil spring 1 is assembled into the suspension device of a vehicle, the first end turn part 11 is located on the lower side and the second end turn part 12 is located on the upper side. The central axis X1 of the coil spring 1 extends in the vertical direction. The wire rod 2 has an axis X2 along the length direction of the wire rod 2.

The first end turn part 11 is supported by a spring seat 20 (shown in FIG. 1) provided in a lower part of the suspension device. The second end turn part 12 is supported by a spring seat 21 (shown in FIG. 2) provided in an upper part of the suspension device. The coil spring 1 is compressed between the lower spring seat 20 and the upper spring seat 21. When the coil spring 1 is compressed in a predetermined load range (the range of load used as the suspension device), the effective spring part 13 has a gap G1 between coil portions 13a adjacent to each other. The coil spring 1 is used in the load range between the assumable minimum and maximum loads. The effective spring part 13 expands and contracts along the direction along the central axis X1 between a maximally compressed full bump state and a maximally extended full rebound state.

An example of the effective spring part 13 has a cylindrical shape in which a pitch P1 (shown in FIG. 1) is constant and a coil radius R1 is substantially constant. Here, the expression "substantially constant" indicates that the variation in the range of the tolerance of the coil spring manufactured by a coiling machine and the variation in the permissible range by springback are practically negligible. Note here that the coil spring may have a non-cylindrical shape in which the pitch P1 and the coil radius R1 vary in a direction along the central axis X1.

The wire rod 2 in this embodiment includes a round cross-sectional portion 30, a rectangular cross-sectional portion 31, and a cross-section varying portion 32. The first end turn part 11 and the effective spring part 13 each comprise a round cross-sectional portion 30. A section S1 (a cross section perpendicular to the axis X2 of the wire rod 2) of the round cross-sectional portion 30 is round. The section S1 of the round cross-sectional portion 30 is substantially constant along the length direction of the wire rod 2. The cross section varying portion 32 is formed between the round cross-sectional portion 30 and the rectangular cross-sectional portion 31. The cross section varying portion 32 varies from round to substantially rectangular in cross-section along the length direction of the wire rod 2.

FIG. 2 is a perspective view of the coil spring 1 with cross sections of portions thereof (near the second end turn part 12) when compressed. The second end turn part 12 comprises a rectangular cross-sectional portion 31. The rectangular cross-sectional portion 31 includes a coil section 33 comprising a plurality (two or more windings) of coil portions 31a, 31b and 31c. In this embodiment, as to a coil diameter R2 (shown in FIG. 2) of the coil section 33, the coil portions 31a, 31b and 31c have diameters equivalent to each other. Note that in another embodiment, the coil portions 31a, 31b and 31c may have coil diameters different from each other.

The rectangular cross-sectional portion 31 has a first surface 41 located on an upper side in FIG. 2, a second surface 42 on a lower side, a third surface 43 on an outer side and a fourth surface 44 on an inner side. The first surface 41 comprises a first plane 41a (shown in FIG. 4). The second surface 42 comprises a second plane 42a (shown in FIG. 4). The first plane 41a and the second plane 42a are, for example, parallel to each other. The term "parallel" here includes the meaning in the strict sense of geometry, but it also covers the concept of a parallel to the extent that variations in the tolerance range of the coil section 33 produced by the coiling machine and variations in the tolerance range due to springback are practically negligible.

The first plane 41a and the second plane 42a are approximately perpendicular to the central axis X1 of the coil spring 1 (shown in FIGS. 1 and 2). In other words, the coil portions 31a, 31b and 31c of the rectangular cross-sectional portion 31 include the first surface 41 and the second surface 42 opposing each other in the coil section 33. The third surface 43 and the fourth surface 44 each extend in a direction along the central axes X1 of the coil spring 1.

Figure 3:
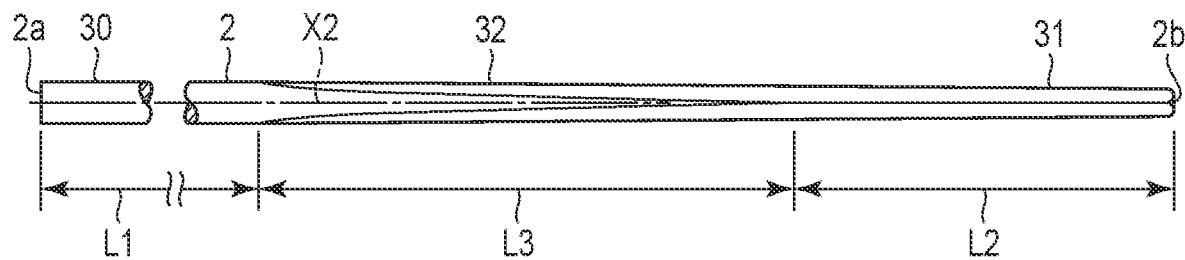
FIG. 3 is a side view of a portion of the wire rod of the coil spring before being formed into a spiral shape.

FIG. 3 shows a part of the wire rod 2 before being coiled. An axis X2 passing through the center of the wire rod 2 extends along the length direction of the wire rod 2. The wire rod 2 shown in FIG. 3 includes a round cross-sectional portion 30 having a length L1, a rectangular cross-sectional portion 31 having a length L2, and a cross section varying portion 32 having a length L3. The round cross-sectional portion 30 has the length L1 which is required for a plurality of coil portions 13a of the effective spring part 13. The rectangular cross-sectional portion 31 is formed over the length L2 from an end 2b of the wire rod 2. The cross section varying portion 32 is formed over the length L3 between the round cross-sectional portion 30 and the rectangular cross-sectional portion 31.

Figure 4:
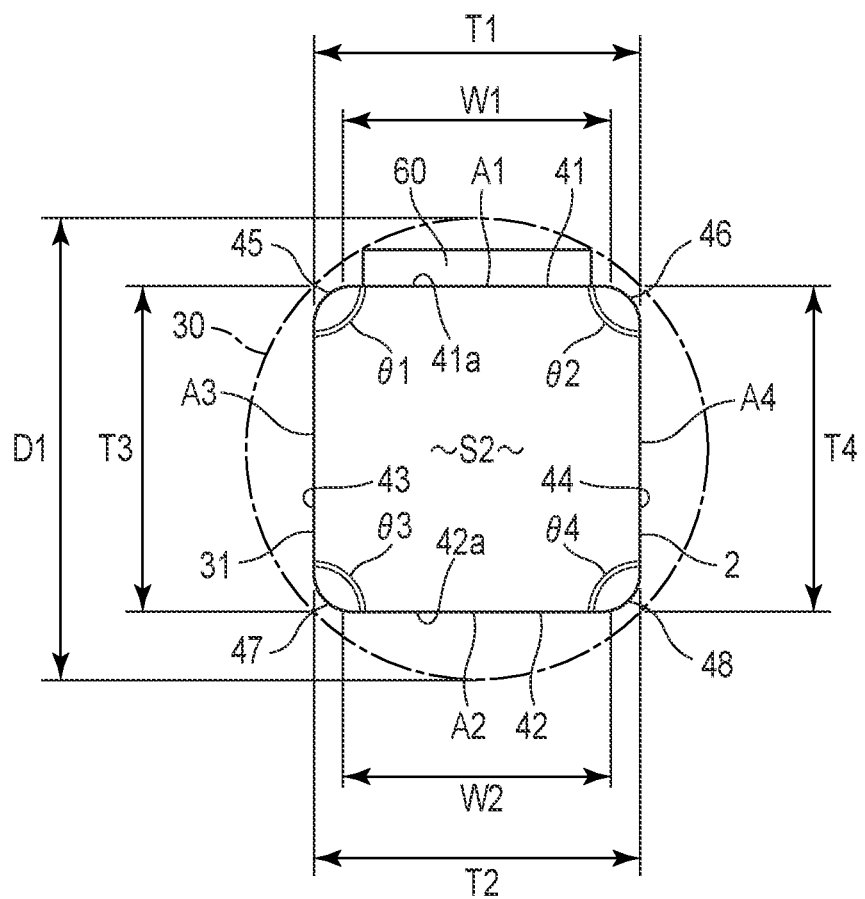
FIG. 4 is a front view schematically showing an example of a quadrangular cross-sectional portion and an example of an elastic coat.

FIG. 4 is a front view schematically showing an example of the rectangular cross-sectional portion 31. A section S2 (a cross-section perpendicular to the axis X2 of the wire rod 2) of the rectangular cross-sectional portion 31 is substantially square in shape. The term "substantially square" referred to in this specification includes a square in the strict sense of geometry, but it also covers such cases where lengths T1, T2, T3 and T4 of respective four sides A1, A2, A3 and A4 are equivalent to each other within the range of machining tolerances as of the section S2 schematically shown in FIG. 4. The length T1 of the first side A1 corresponds to a width of the first surface 41. The length T2 of the second side A2 corresponds to a width of the second surface 42. The length T3 of the third side A3 corresponds to a width of the third surface 43, and the length T4 of the fourth side A4 corresponds to a width of the fourth side 44.

The lengths T1, T2, T3 and T4 of the respective sides A1, A2, A3 and A4 are each a ½ of square root ($1/\sqrt{2}$) or less of the diameter D1 of the round cross-sectional portion 30. Internal angles $\theta 1$, $\theta 2$, $\theta 3$ and $\theta 4$ made by respective sides A1, A2, A3 and A4 with each other are substantially within the range of machining tolerances, and approximately 90°. At intersections of each adjacent pair of the sides A1, A2, A3 and A4, arc-shaped corner portions 45, 46, 47 and 48 are formed. The section S2 of the rectangular cross-sectional portion 31 is substantially constant along the length direction of the wire rod 2 (along the axis X2). The cross-sectional area of the rectangular cross-sectional portion 31 is smaller than that of the round cross-sectional portion 30.

A section S3 (a cross-section perpendicular to the axis X2 of the wire rod 2) of the cross section varying portion 32 decreases its cross-sectional area as the shape gradually changes from round to substantial square from the round cross-sectional portion 30 to the rectangular cross-sectional area 31. The cross section varying portion 32 is located between the round cross-sectional portion 30 and the rectangular cross-sectional portion 31, to have a length L3 of 1.0 winding or more.

As shown in FIG. 2, the section S3 of the cross section varying portion 32 comprises a first plane portion 51, a second plane portion 52, a third plane portion 53, a fourth plane portion 54, a first arc portion 55, a second arc portion 56, a third arc portion 57 and a fourth arc portion 58. The first plane portion 51 is continuous to the first plane 41a of the rectangular cross-sectional portion 31. The second plane portion 52 is continuous to the second plane 42a of the rectangular cross-sectional portion 31. The third plane portion 53 is continuous to the third surface 43 of the rectangular cross-sectional portion 31. The fourth plane portion 54 is continuous to the fourth surface 44 of the rectangular cross-sectional portion 31.

The first arc portion 55 is continuous to the first corner portion 45 (shown in FIG. 4) of the rectangular cross-sectional portion 31. The second arc portion 56 is continuous to the second corner portion 46 of the rectangular cross-sectional portion 31. The third arc portion 57 is continuous to the third corner 47 of the rectangular cross-sectional portion 31. The fourth arc portion 58 is continuous to the fourth corner portion 48 of the rectangular cross-sectional portion 31.

The coil spring 1 of this embodiment includes an elastic coat 60. The elastic coat 60 is formed from a longitudinal middle (the round cross-sectional portion 30) of the effective spring part 13 of the coil spring 1 to the end 2b of the wire rod 2 over the cross section varying portion 32 and the rectangular cross-sectional portion 31. When the central axis X1 of the coil spring 1 extends in the vertical direction as shown in FIG. 1, the elastic coat 60 is provided on at least one of upper and lower surfaces of the wire rod 2. The elastic coat 60 of the coil spring 1 shown in FIG. 1 is provided on the upper surface of the wire rod 2 (the first surface 41 and the like). Note that the elastic coat 60 may be provided on the lower surface of the wire rod 2 (the second surface 42 and the like), or on both the upper and lower surfaces of the wire rod 2.

In the coil spring 1 of this embodiment, the elastic coat 60 is provided on some of the coil portions 13a, 31a, 31b and 31c. The elastic coat 60 may as well be provided on only those of the coil portions 13a, 31a, 31b and 31c, which may possibly come in contact with each other when the coil spring 1 is compressed.

The elastic coat 60 of this embodiment includes a first coat portion 60a provided on the round cross-sectional portion 30, a second coat portion 60b provided on the cross section varying portion 32, and a third coat portion 60c provided on the rectangular cross sectional portion 31. The first coat portion 60a is provided on the upper surface of the round cross-sectional portion 30 in FIG. 2. The second coat portion 60b is provided on the upper surface of the cross section varying portion 32 (the first plane portion 51). The third covered portion 60c is provided on the upper surface of the rectangular cross-sectional portion 31 (the first plane 41a). The first coat portion 60a, the second coat portion 60b and the third coating portion 60c are formed to be continuous into one body along the length direction of the wire rod 2.

FIG. 2 shows the coil spring 1 in a state of being compressed by a load applied in the direction along the central axis X1. When the coil spring 1 is compressed, the coil portions 31a, 31b and 31c are stacked on each other via the elastic coat 60. More specifically, in the coil section 33, each adjacent pair of coil portions 31a, 31b and 31c are stacked on each other with the elastic coat 60 interposed therebetween. With this structure, the elastic coating portion 60 is compressed between the first plane 41a and the second plane 42a, and therefore the thickness of the elastic coat 60 decreases. When the load of compression is removed, the elastic coat 60 restores substantially the original shape and thickness due to the elastic restoring force.

As shown in FIG. 4, the lengths T1, T2, T3 and T4 of the sides A1, A2, A3 and A4 of the rectangular cross-sectional portion 31 each are one half of the square root ($1/\sqrt{2}$) of the diameter D1 of the round cross-sectional portion 30. The cross-sectional area of the rectangular cross-sectional portion 31 is smaller than that of the round cross-sectional portion 30. The polar moment of inertia of area of the rectangular cross-sectional portion 31 is smaller than the polar moment of inertia of area of the round cross-sectional portion 30. The polar moment of inertia of area of the cross section varying portion 32 is larger than the polar moment of inertia of area of the rectangular cross-sectional portion 31, but smaller than the polar moment of inertia of area of the round cross-sectional portion 30.

When the coil spring 1 is compressed by the load in the direction along the central axis X1 and the load is small, the coil portions 31a, 31b and 31c of the rectangular cross-sectional portion 31 are brought into tight contact with each other. As the load increases, the coil portions of the cross section varying portion 32 as well are brought into tight contact with each other. When the load reaches the maximum, the coil portion 13a of the effective spring part 13 of the round cross-sectional portion 30 may be brought into contact therewith. Thus, the coil spring 1 of this embodiment has nonlinear characteristics in which the spring constant increases as the load increases.

One example of the elastic coat 60 is made of a cured material of a composition of a resin having urethane bonds (for example, urethane resin). As needed, an additive such as a thickener is blended to the composition. The aforementioned composition is applied to the surface of the wire rod 2 from a nozzle of a coating device to have a predetermined thickness. The coil spring 1 coated with the composition is heated by a furnace or the like to cure the composition. As the composition is cured, the elastic coat 60 is formed on the surface of the wire rod 2. The elastic coat 60 is secured to the surface of the wire rod 2 by the adhesive force of its own.

An example of the material for the elastic coat 60 is a composition containing a polymer polyol, an isocyanate and a chain lengthener. Examples of the polymer polyol include polycarbonate-type polyols, polyether polyols having a bisphenol structure, lactone polyols, polyester polyols and the like. Examples of the chain lengthener include ethylene glycol, 1,4-butanediol, 1,6-hexanediol, trimethylolpropane, glycerin and the like. In short, the chain lengtheners are bifunctional to tetrafunctional polyols with molecular weights of 60 to 300 and the like. Another example of the material for the elastic coat 60 is a composition containing a prepolymer in which a polyol reacts with an isocyanate. Examples of the polyol include polymeric polyols as described above or a low molecular weight polyol listed in the examples of the chain lengthener.

When assuming that the coil spring 1 is used in a suspension spring for a vehicle, the tear strength of the elastic coat 60 at each of room temperature (25° C.) and high temperature (80° C.) should preferably be 20 kN/m or higher from the point of view of durability. In consideration of the durability at room temperature, the tear strength of the elastic coat 60 should preferably be 60 kN/m or higher. In consideration of the shock absorbing property of the elastic coat 60, the upper limit of the tear strength at each of room temperature (25° C.) and high temperature (80° C.) should preferably be 350 kN/m or less.

The tearing strength here was measured by a tear test based on the Japanese Industrial Standard JISK7311. In the tear test, a sample of a predetermined shape (right-angled tear test sample) was attached to a tensile testing machine with a gripping width of 25 mm and a gripping distance of 40 mm. The sample was stretched at a tensile speed of 300 mm/min and a maximum load F3 (N) at which the sample was torn was measured. The tensile strength (kN/m) was calculated based on the measured maximum load F3 (N) and the formula (1) provided below.

$$\text{Tensile strength}(kN/m) = F3/(\text{thickness of sample}(m)) \quad (1)$$

Examples 1 to 11

Eleven types of elastic coats 60A to 60K according to Examples 1 to 11 will now be described. The materials for the elastic coats 60A to 60K are the same as that of the elastic coat 60 (the resin composition) described in the embodiment previously described.

FIGS. 5A to 5K show elastic coats 60A to 6K having cross sections different from each other in an uncompressed state. The width T1 of the first surface 41 of the rectangular cross-sectional portion 31 (shown in FIG. 4) and the width T2 of the second surface 42 are both 7 mm. The radius of curvature of the corner portions 45 and 46 is 0.8 mm at maximum.

As shown in FIG. 4, the first surface 41 includes a first plane 41a formed between the corner portions 45 and 46. The second plane 42 includes a second plane 42a formed between the corner portions 47 and 48. The width W1 of the first plane 41a and the width W2 of the second plane 42a are both 5.4 mm. The widths Y1 of the elastic coats 60A to 60K shown in FIGS. 5A to 5K are all 5.4 mm. The widths Y1 of the elastic coats 60A to 60K should preferably be less than or equal to the width W1 of the first plane 41a. But, a part of the elastic coats 60A to 60K may be attached to the corner portions 45 and 46.

FIGS. 6A to 6K are cross-sectional views respectively showing the elastic coats 60A to 60K shown in FIGS. 5A to 5K in a compressed state. The load of compression is 60 N. FIGS. 7A through 7K respectively show the shear stress acting on the interface 70 between each respective one of the elastic coats 60A to 60K and the respective wire rod 2 when the elastic coats 60A to 60K are in a compressed state.

Example 1

Figure 5A:
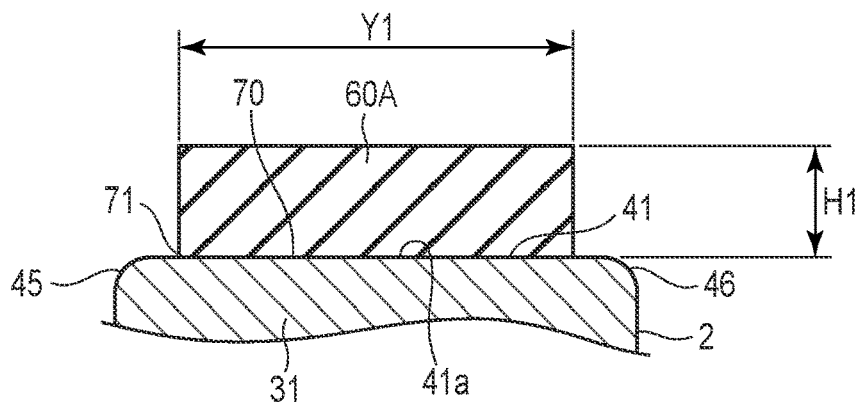
FIGS. 5A to 5K are cross-sectional views each showing a part of a quadrangular cross-sectional portion and parts of eleven types of elastic coats with different cross-sections, respectively.
Figure 6A:
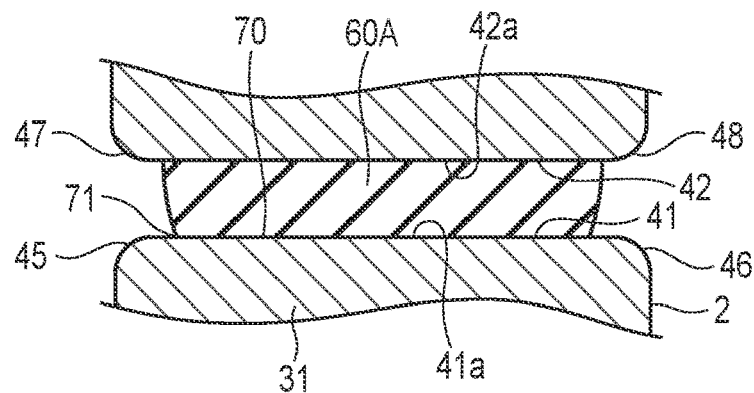
FIGS. 6A to 6K are cross-sectional views respectively showing the elastic coats shown in FIGS. 5A to 5K in a compressed state.

FIG. 5A shows the elastic coat 60A of Example 1. The cross-section of the elastic coat 60A was a horizontal rectangle, and a thickness (height) H1 was 1.5 mm. FIG. 6A shows the state where the elastic coat 60A was compressed between the first plane 41a and the second plane 42a. When the elastic coat 60A was compressed, shear stress was created at the interface 70 between the first plane 41 and the elastic coat 60A. The maximum value of the shear stress was 3.09 MPa and the maximum value of the compressive stress was 8.12 MPa. FIG. 7A shows the relationship between the distance from the end 71 of the elastic coat 60A and the shear stress.

Example 2

Figure 5B:
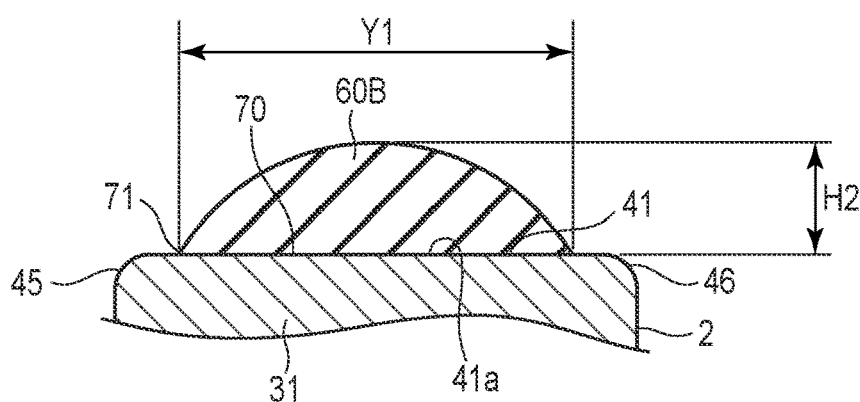
Figure 6B:
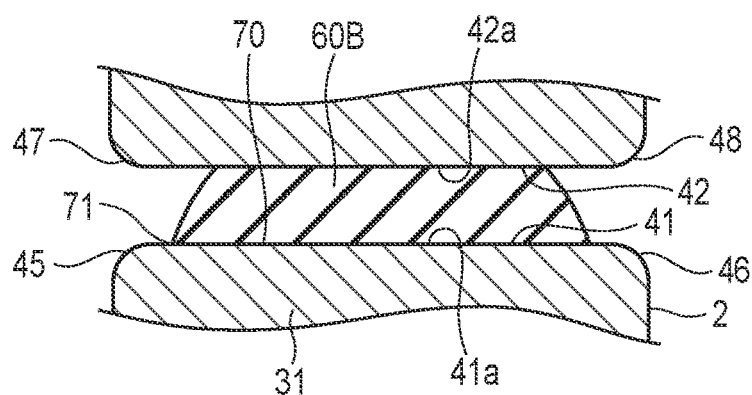

FIG. 5B shows the elastic coat 60B of Example 2. The cross-section of the elastic coat 60B was a convex upward, and a height H2 at the center was 1.5 mm. As shown in FIG. 6B, when the elastic coat 60B was compressed, the maximum value of the shear stress at the interface 70 was 3.05 MPa and the maximum value of the compressive stress was 12.63 MPa. FIG. 7B shows the relationship between the distance from the end 71 of the elastic coat 60B and the shear stress.

Example 3

Figure 5C:
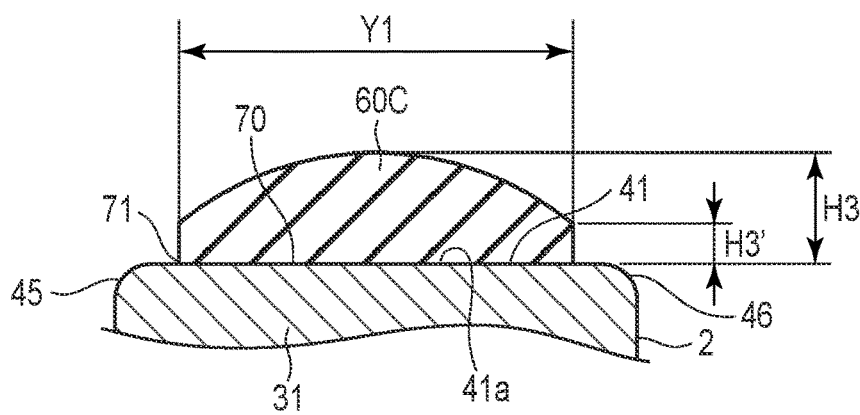
Figure 6C:
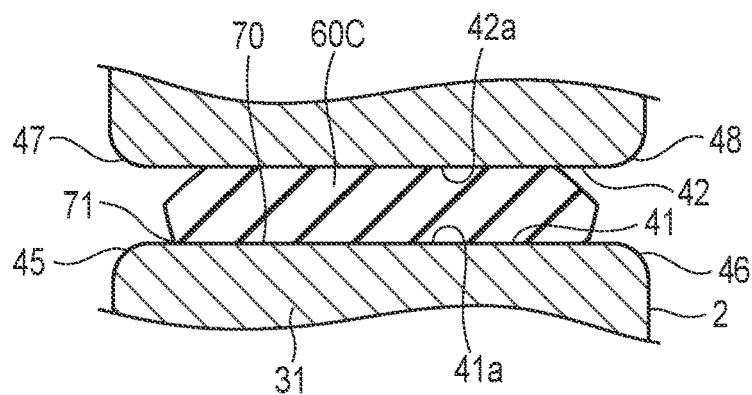

FIG. 5C shows the elastic coat 60C of Example 3. The cross-section of the elastic coat 60C was a slightly flattened convex upward, and a height H3 at the center was 1.5 mm and the height H3' at both ends was 0.5 mm. As shown in FIG. 6C, when the elastic coat 60C was compressed, the maximum value of the shear stress at the interface 70 was 2.78 MPa and the maximum value of the compressive stress was 11.42 MPa. FIG. 7C shows the relationship between the distance from the end 71 of the elastic coat 60C and the shear stress.

Example 4

Figure 5D:
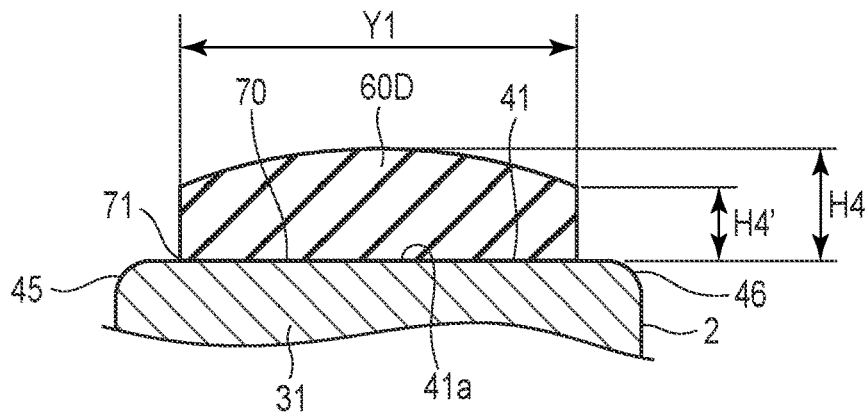
Figure 6D:
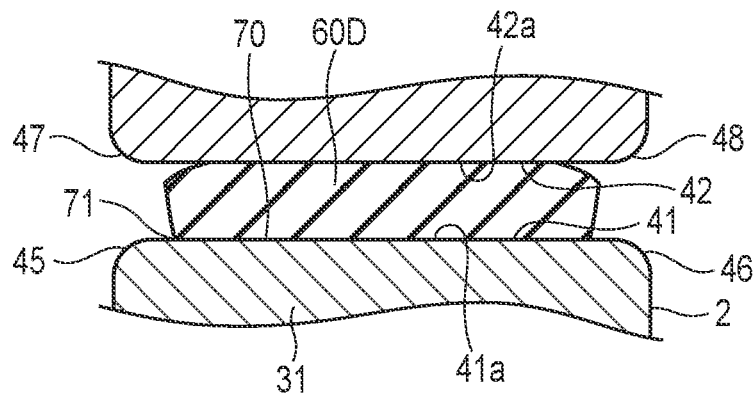
Figure 7D:
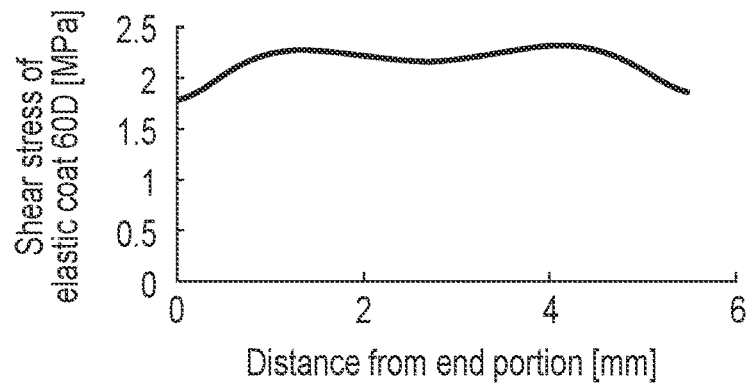

FIG. 5D shows the elastic coat 60D of Example 4. The cross-section of the elastic coat 60D was a flattened convex upward, and a height H4 at the center was 1.5 mm and the height H4' at both ends was 1.0 mm. As shown in FIG. 6D, when the elastic coat 60D was compressed, the maximum value of the shear stress at the interface 70 was 2.28 MPa and the maximum value of the compressive stress was 9.36 MPa. FIG. 7D shows the relationship between the distance from the end 71 of the elastic coat 60D and the shear stress.

Example 5

Figure 5E:
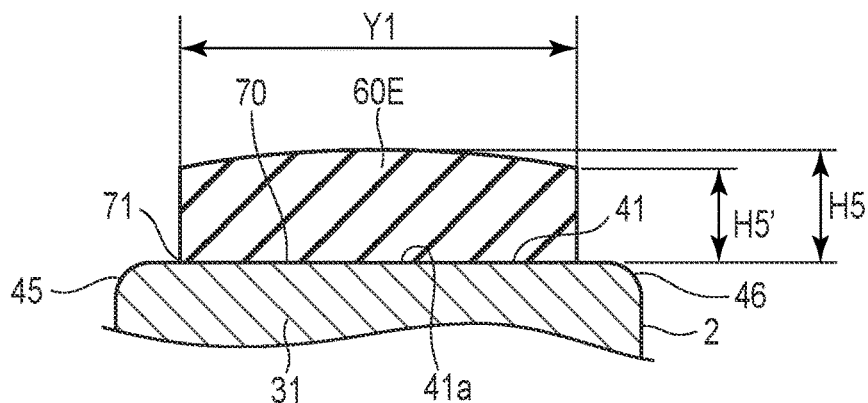
Figure 6E:
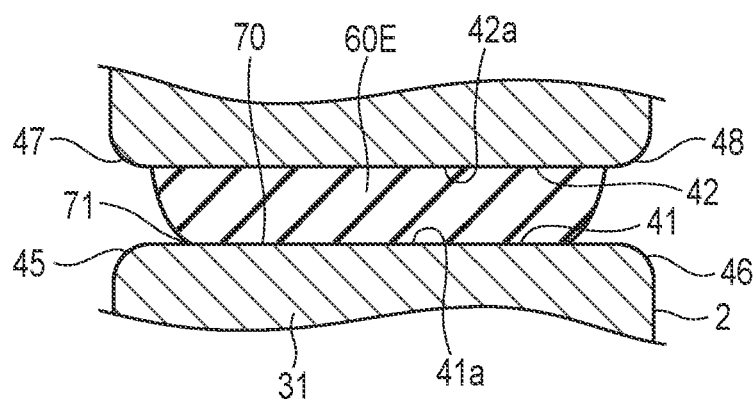
Figure 7E:
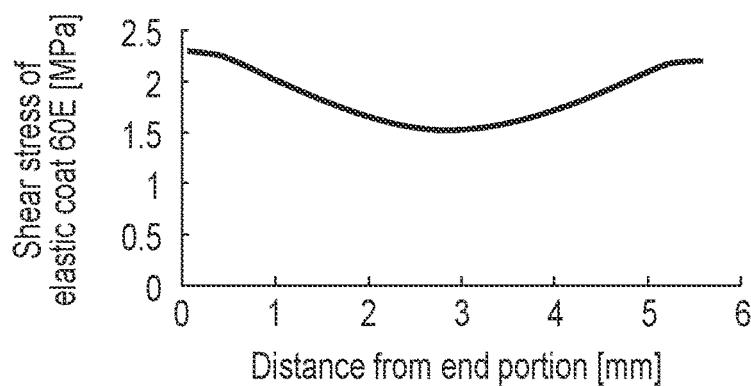

FIG. 5E shows the elastic coat 60E of Example 5. The cross-section of the elastic coat 60E was a substantially flattened convex, and a height H5 at the center was 1.5 mm and a height H5' at both ends was 1.3 mm. As shown in FIG. 6E, when the elastic coat 60E was compressed, the maximum value of the shear stress at the interface 70 was 2.35 MPa and the maximum value of the compressive stress was 7.39 MPa. FIG. 7E shows the relationship between the distance from the end 71 of the elastic coat 60E and the shear stress.

Example 6

Figure 5F:
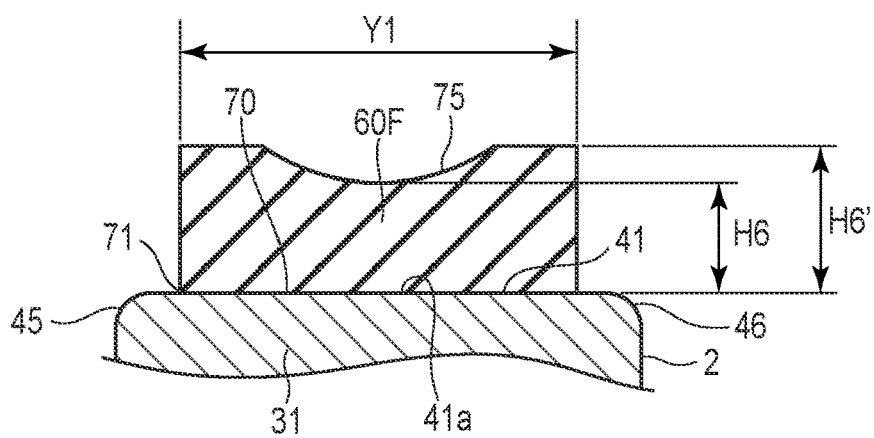
Figure 6F:
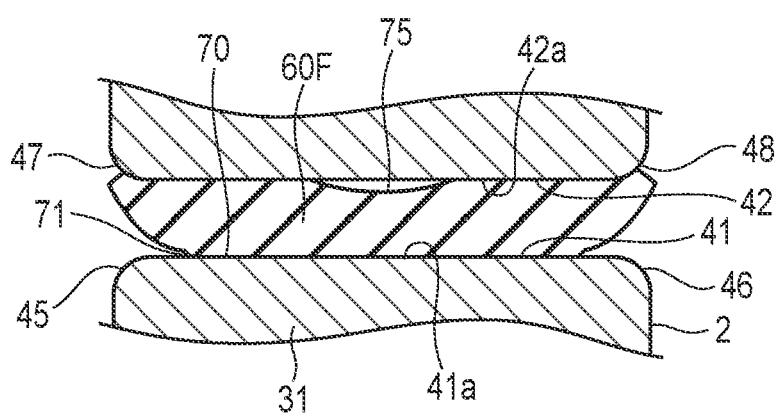
Figure 7F:
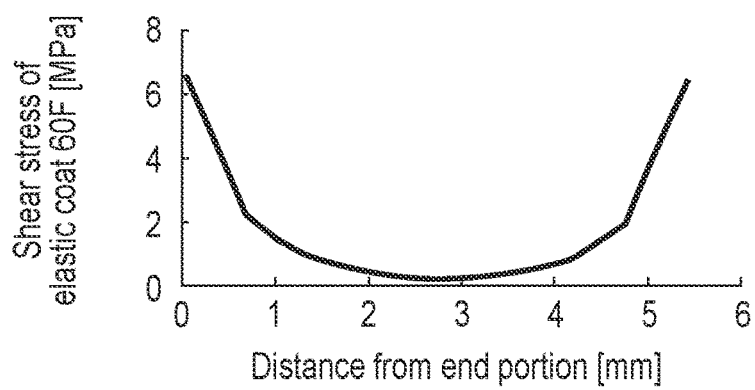

FIG. 5F shows the elastic coat 60F of Example 6. The elastic coat 60F had an arc-shaped concave portion 75 having a curvature radius of 3.63 mm. A height H6 at the center of the concave portion 75 was 1.5 mm and a height H6' at both ends was 2.0 mm. As shown in FIG. 6F, when the elastic coat 60F was compressed, the maximum value of the shear stress at the interface 70 was 6.83 MPa and the maximum value of the compressive stress was 20.56 MPa. FIG. 7F shows the relationship between the distance from the end 71 of the elastic coat 60F and the shear stress.

Example 7

Figure 5G:
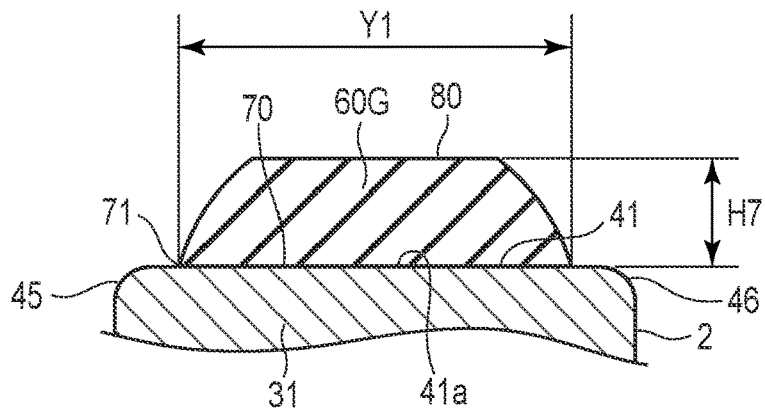
Figure 6G:
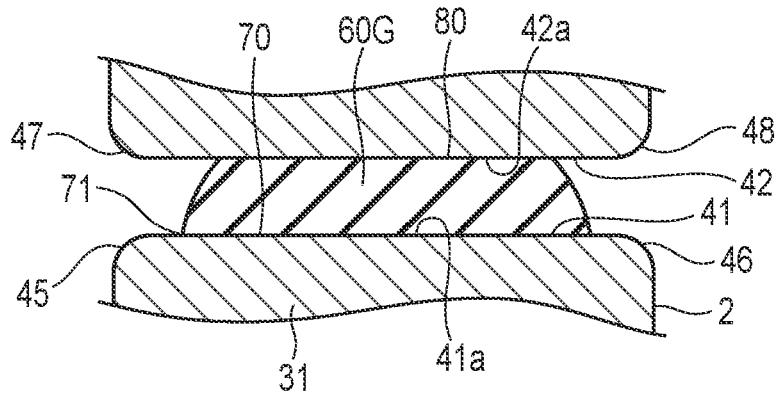

FIG. 5G shows the elastic coat 60G of Example 7. The cross-section of the elastic coat 60G was convex upward and included a flat surface 80 in the center. A height H7 of the flat surface 80 was 1.5 mm. As shown in FIG. 6G, when the elastic coat 60G was compressed, the maximum value of the shear stress at the interface 70 was 2.49 MPa and the maximum value of the compressive stress was 8.68 MPa. FIG. 7G shows the relationship between the distance from the end 71 of the elastic coat 60G and the shear stress.

Example 8

Figure 5H:
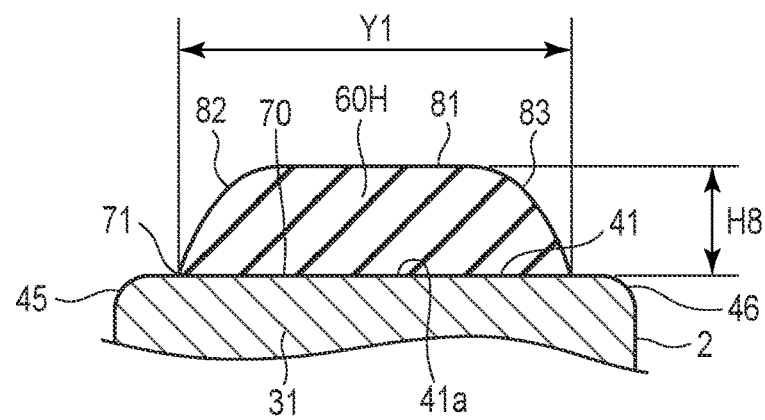
Figure 6H:
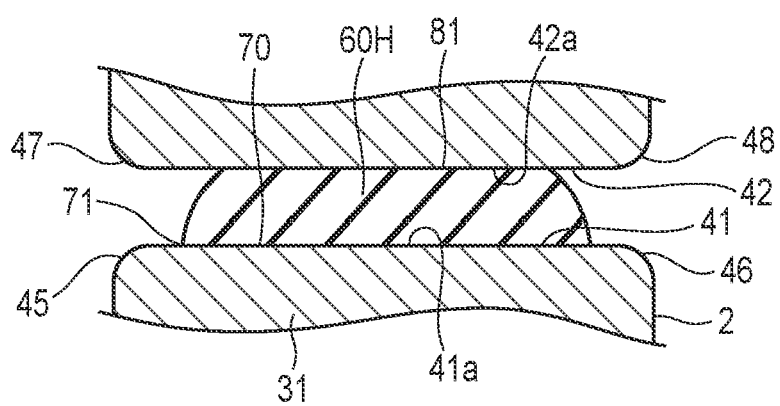

FIG. 5H shows the elastic coat 60H of Example 8. The cross-section of the elastic coat 60H was concave upward and included a flat surface 81. A height H8 of the flat surface 81 was 1.5 mm. On respective sides of the flat surface 81, curved surfaces 82 and 83 were formed. As shown in FIG. 6H, when the elastic coat 60H was compressed, the maximum value of the shear stress at the interface 70 was 2.51 MPa and the maximum value of the compressive stress was 8.82 MPa. FIG. 7H shows the relationship between the distance from the end 71 of the elastic coat 60H and the shear stress.

Example 9

Figure 5I:
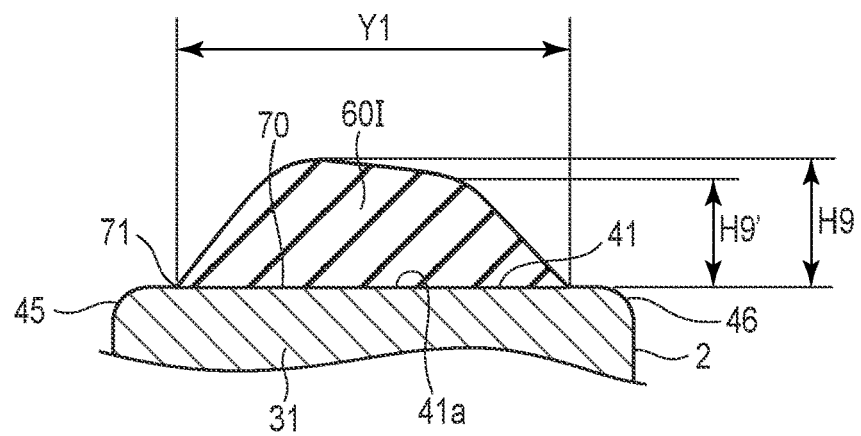
Figure 6I:
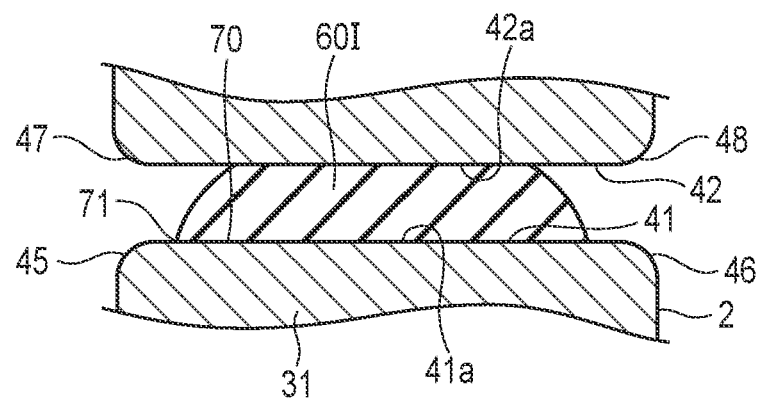

FIG. 5I shows the elastic coat 60I of Example 9. The cross-section of the elastic coat 60I had a first height H9 and a second height H9'. The first height H9 and the second height H9' were 2.0 and 1.5 mm, respectively. As shown in FIG. 6I, when the elastic coat 60I was compressed, the maximum value of the shear stress at the interface 70 was 3.46 MPa and the maximum value of the compressive stress was 15.35 MPa. FIG. 7I shows the relationship between the distance from the end 71 of the elastic coat 60I and the shear stress.

Example 10

Figure 5J:
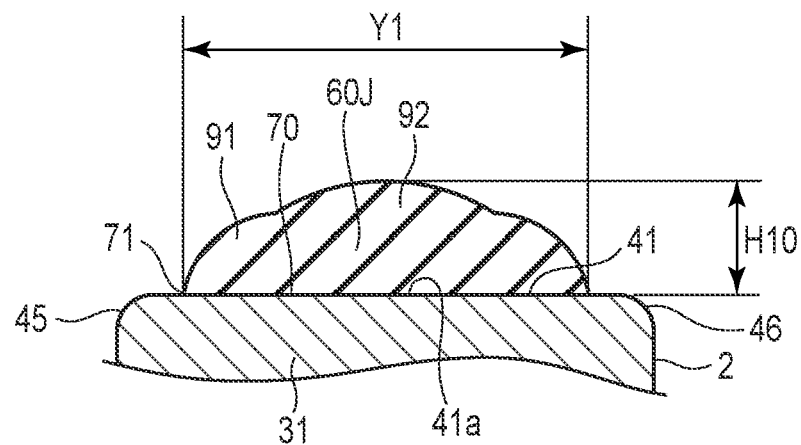
Figure 6J:
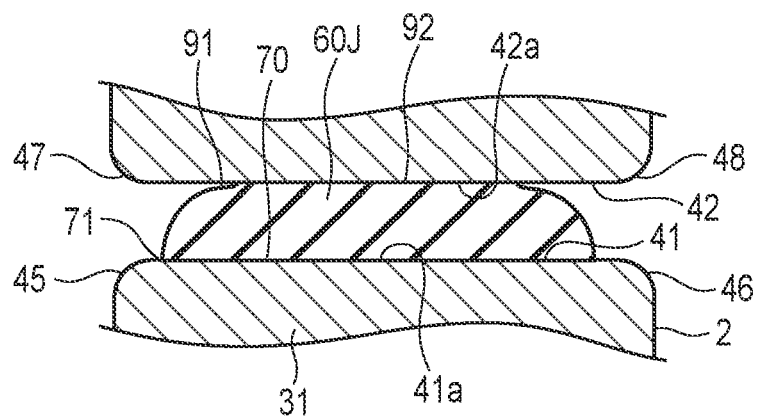
Figure 7J:
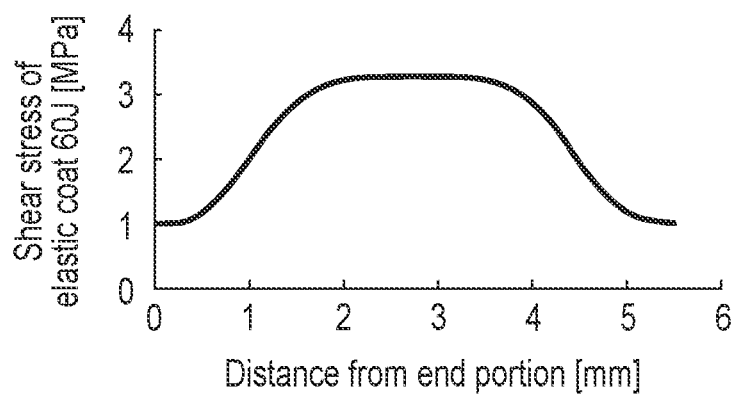

FIG. 5J shows the elastic coat 60J of Example 10. The cross-section of the elastic coat 60J included a low convex portion 91 and a high convex portion 92. A height H10 of the high convex portion 92 was 1.5 mm. As shown in FIG. 6J, when the elastic coat 60J was compressed, the maximum value of the shear stress at the interface 70 was 3.34 MPa and the maximum value of the compressive stress was 13.87 MPa. FIG. 7J shows the relationship between the distance from the end 71 of the elastic coat 60J and the shear stress.

Example 11

Figure 5K:
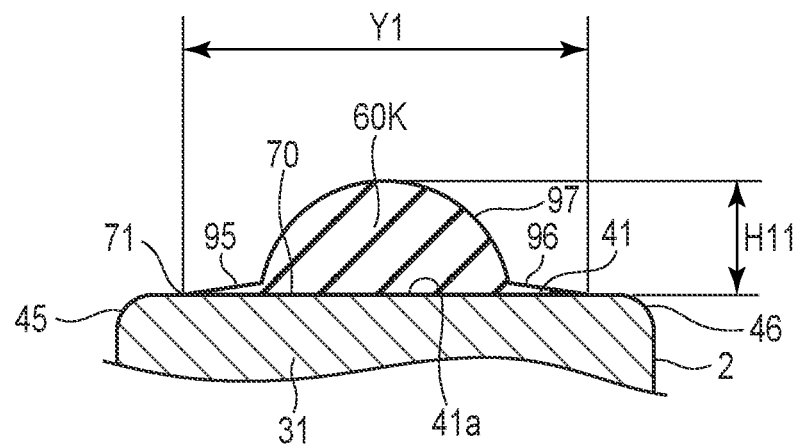
Figure 6K:
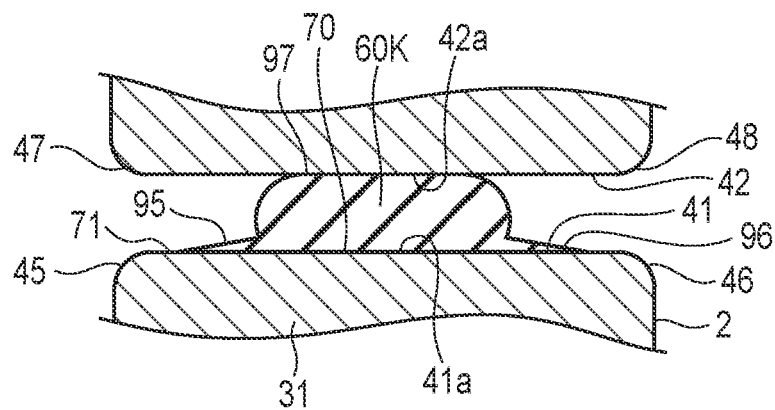
Figure 7K:
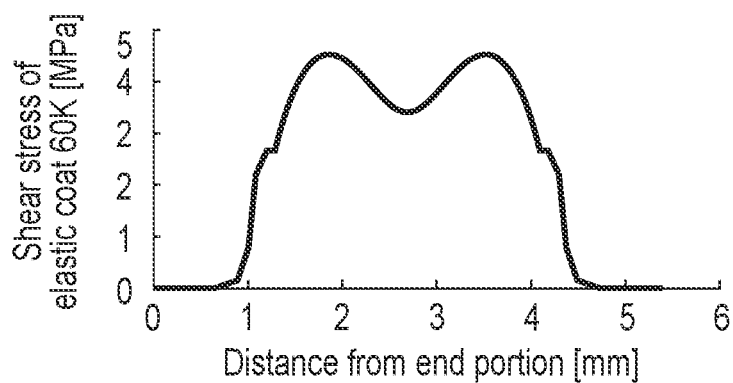

FIG. 5K shows the elastic coat 60K of Example 11. The cross-section of the elastic coat 60K included thin base portions 95 and 96 formed at respective ends and a substantially semicircular convex portion 97 formed in the center. A height H11 of the convex portion 97 was 1.5 mm. As shown in FIG. 6K, when the elastic coat 60K was compressed, the maximum value of the shear stress at the interface 70 was 4.65 MPa and the maximum value of the compressive stress was 17.37 MPa. FIG. 7K shows the relationship between the distance from the edge 71 of the elastic coat 60K and the shear stress.

[Evaluation of Examples 1 to 11] The elastic coats 60A to 60K of Examples 1 to 11 described above were each provided on the first plane 41a of the rectangular cross-sectional portion 31 of the coil spring 1. The elastic coats 60A to 60K were each formed to be continuous from the longitudinal middle (the round cross-sectional portion 30) of the effective spring part 13 of the coil spring 1 over the cross section varying portion 32 and the rectangular cross-sectional portion 31 along the length direction of the wire rod 2. The coil springs comprising the elastic coats 60A to 60K having such structures described above can suppress drawbacks such as banging noise and wear that occur when the coil portions 31a, 31b and 31c are brought into direct contact with each other.

When assuming that the coil springs are used in a suspension device of a vehicle, it is preferable that the shear stress at the interface 70 be 6.0 MPa or less. More preferably, the maximum value for the shear stress should be 3.5 MPa or less. In each of the elastic coat 60F shown in FIGS. 5F, 6F and 7F and the elastic coat 60K shown in FIGS. 5K, 6K and 7K, the shear stress at the interface 70 exceeded 3.5 MPa.

However, even these elastic coats 60F and 60K may be used without problems depending on the use of the coil spring. With regard to compressive stress, the elastic coats 60A to 60E and 60G to 60K exhibited desirable values (20 MPa) or less. The compressive stress of the elastic coat 60F in Example 6 slightly exceeded 20 MPa, but it can be used in some applications.

Another Embodiment

Figure 8:
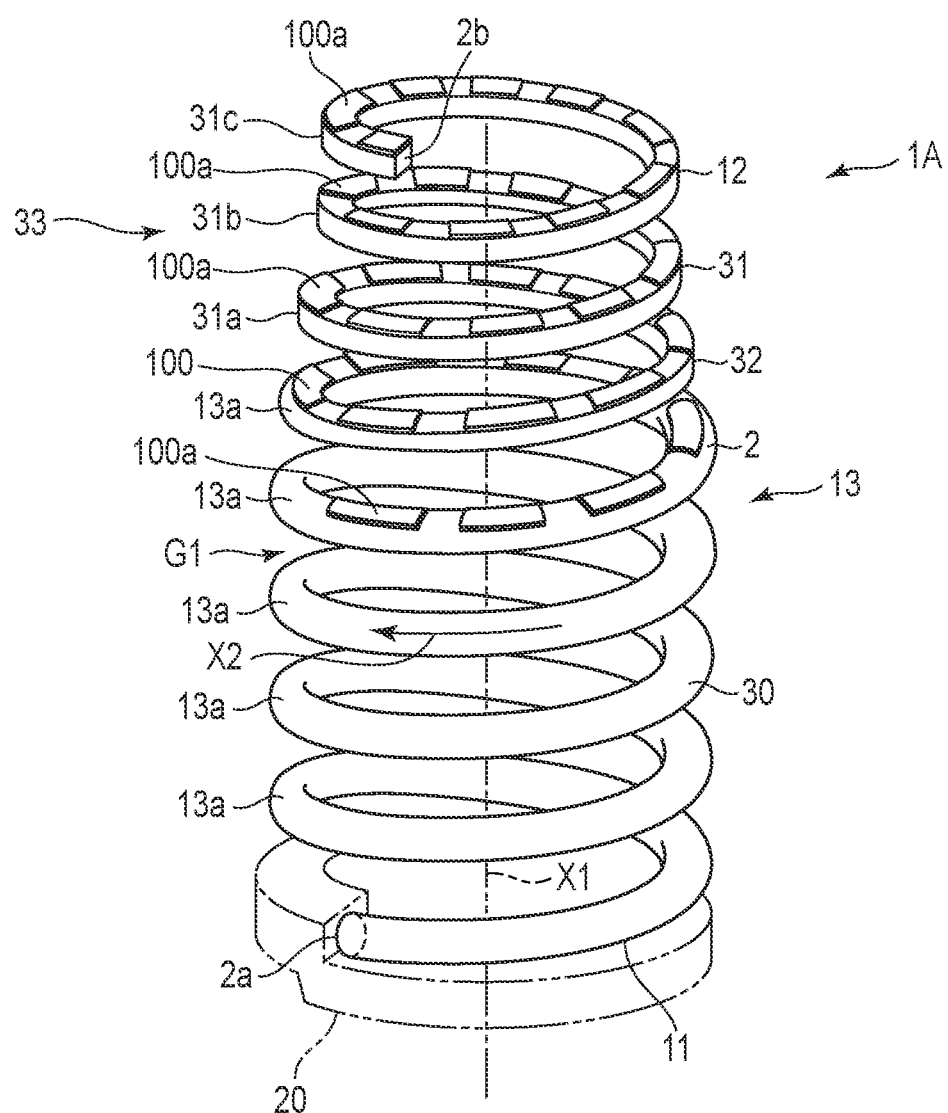
FIG. 8 is a perspective view of a coil spring according to another embodiment.

FIG. 8 shows a coil spring 1A according to another embodiment. An elastic coat 100 of the coil spring 1A of this embodiment comprises a plurality of elastic coat elements 100a disposed to be spaced apart from each other along the length direction of a wire rod 2. The material and cross-sectional shape of the elastic coat elements 100a are common to the elastic coat 60 of the first embodiment. The length and thickness of the elastic coat elements 100a, as well as the locations of the elements 100a are set as necessary. The other configurations are common to those the coil spring 1 of the first embodiment (FIG. 1), and therefore these common parts are denoted by common reference symbols and the descriptions thereof will be omitted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coil spring including a wire rod with one end and another end and including a coil section comprising a plurality of coil portions,
    the wire rod comprising:
    a round cross-sectional portion whose cross-section perpendicular to a longitudinal direction of the wire rod is round;
    a rectangular cross-sectional portion whose cross-section perpendicular to the longitudinal direction of the wire rod is rectangular, the rectangular cross-sectional portion including a first plane at an upper side thereof, a second plane at a lower side thereof, an outer side surface, an inner side surface, and arc-shaped corner portions formed on respective sides of the first plane, and the first plane and the second plane opposing each other in the coil section; and
    a cross section varying portion formed between the round cross-sectional portion and the rectangular cross-sectional portion,
    the coil spring comprising an elastic coat provided on at least one of the first plane and the second plane of the rectangular cross-sectional portion, and
    the elastic coat comprising:
    a first coat portion provided on the round cross-sectional portion;
    a second coat portion provided on the cross section varying portion; and
    a third coat portion provided on the rectangular cross-sectional portion,
    wherein a width of the third coat portion is less than or equal to a width of the first plane, and
    wherein the rectangular cross-sectional portion comprises a coat-protect portion provided between the outer side surface and the elastic coat.

2. The coil spring of claim 1, wherein the first coat portion, the second coat portion, and the third coat portion are continuous along the longitudinal direction of the wire rod.

3. The coil spring of claim 1, further comprising:
    a first end turn part including the one end of the wire rod;
    a second end turn part including the other end of the wire rod; and
    an effective spring part between the first end turn part and the second end turn part,
    wherein one of the first end turn part and the second end turn part includes the rectangular cross-sectional portion.

4. The coil spring of claim 1, wherein:
    the cross section varying portion comprises a first plane portion continuous to the first plane of the rectangular cross-sectional portion, and
    the elastic coat is provided continuously over the first plane and the first plane portion.

5. The coil spring of claim 1, wherein the elastic coat is made of a cured material of a resin having urethane bonds, and tear strengths of the elastic coat at 25° C. and 80° C. are 20 kN/m or more but 350 kN/m or less.

6. The coil spring of claim 1, wherein a shear stress of the elastic coat at an interface between the wire rod and the elastic coat is 6.0 M Pa or less at 25° C.

7. The coil spring of claim 1, wherein the elastic coat is provided on a part of the plurality of coil portions.

8. The coil spring of claim 7, wherein the elastic coat is provided only on those coil portions of the plurality of coil portions that may come into contact with each other when the coil spring is compressed.

9. The coil spring of claim 1, wherein the elastic coat comprises a plurality of elastic coat elements disposed to be spaced apart from each other along the longitudinal direction of the wire rod.

10. The coil spring of claim 1, wherein the coat-protect portion comprises at least one of the arc-shaped corner portions.

11. The coil spring of claim 10, wherein the at least one of the arc-shaped corner portions is provided between the outer side surface and the elastic coat.

12. The coil spring of claim 1, wherein the coat-protect portion is provided between the outer side surface and a portion of the elastic coat that is closest to the outer side surface.

13. The coil spring of claim 1, wherein the elastic coat does not extend onto the outer side surface.

* * * * *